United States Patent
Chen et al.

(10) Patent No.: US 10,193,477 B2
(45) Date of Patent: Jan. 29, 2019

(54) METHOD FOR ESTIMATING THE ANGULAR POSITION OF A ROTOR OF AN ELECTRIC DRIVE SYSTEM

(71) Applicant: Valeo Siemens eAutomotive France SAS, Cergy (FR)

(72) Inventors: Keyu Chen, Hellemmes-Lille (FR); Wided Zine, Paris (FR); Lingfei Yu, Shenzhen (FR); Zaatar Makni, Chilly Mazarin (FR)

(73) Assignee: Valeo Siemens eAutomotive France SAS, Cergy (FR)

( * ) Notice: Subject to any disclaimer, the term of this patent is extended or adjusted under 35 U.S.C. 154(b) by 0 days.

(21) Appl. No.: 15/890,479

(22) Filed: Feb. 7, 2018

(65) Prior Publication Data
US 2018/0226906 A1 Aug. 9, 2018

(30) Foreign Application Priority Data
Feb. 8, 2017 (FR) ...................... 17 51047

(51) Int. Cl.
*H02P 1/04* (2006.01)
*H02P 6/34* (2016.01)
(Continued)

(52) U.S. Cl.
CPC ............... *H02P 6/34* (2016.02); *B60L 15/20* (2013.01); *G06N 3/04* (2013.01); *G06N 3/08* (2013.01);
(Continued)

(58) Field of Classification Search
CPC ...... H02P 1/00; H02P 1/04; H02P 6/00; H02P 6/001; H02P 6/002; H02P 6/06;
(Continued)

(56) References Cited

U.S. PATENT DOCUMENTS 8,269,445 B2 * 9/2012 Patel .................... B60L 3/0038
318/400.37
9,325,263 B1 4/2016 Costanzo et al.
(Continued)

FOREIGN PATENT DOCUMENTS

FR 3028690 A1 5/2016

OTHER PUBLICATIONS

Search Report for French Application No. 1751047 dated Oct. 24, 2017.

*Primary Examiner* — Antony M Paul
(74) *Attorney, Agent, or Firm* — McCormick, Paulding & Huber LLP

(57) ABSTRACT

The present invention has for object a method for estimating the angular position of a rotor in relation to a stator in a rotary electric machine, such as an electric machine of an electric or hybrid motorization system, comprising:
estimating the angular position and/or of the rotation speed of the rotor by a method of injecting high frequency signals as long as the absolute value of the rotation speed of the rotor, derived from said angular position, is less than a first predefined threshold;
estimating the angular position and/or of the rotation speed of the rotor by a model coming from a learning method as long as the absolute value of the rotation speed of the rotor, derived from said angular position, is greater than a second predefined threshold.

20 Claims, 2 Drawing Sheets

(51) Int. Cl.
    *B60L 15/20*     (2006.01)
    *G06N 3/04*     (2006.01)
    *G06N 3/08*     (2006.01)
    *H02P 6/18*     (2016.01)
    *H02P 23/00*     (2016.01)
    *H02P 6/08*     (2016.01)
    *H02P 21/18*     (2016.01)

(52) U.S. Cl.
    CPC ................ *H02P 6/08* (2013.01); *H02P 6/183* (2013.01); *H02P 21/18* (2016.02); *H02P 23/0018* (2013.01); *H02P 2203/05* (2013.01); *Y10S 903/906* (2013.01)

(58) Field of Classification Search
    CPC ...... H02P 6/08; H02P 6/12; H02P 6/14; H02P 6/18; H02P 6/165; H02P 21/00; H02P 21/001; H02P 21/0014; H02P 21/0021; H02P 21/0025; H02P 21/0085; H02P 21/13; H02P 21/146; H02P 23/00; H02P 23/0013; H02P 23/0018; H02P 23/0022; H02P 23/0027; H02P 23/0031; H02P 23/12; H02P 25/00; H02P 25/021; H02P 25/08; H02P 25/085; H02P 25/102; H02P 25/145; H02P 27/00; H02P 27/026; H02P 27/045; H02P 27/06
    USPC .... 318/400.01, 400.02, 400.14, 700, 400.33, 318/727, 779, 799, 800, 801, 430, 268; 363/40, 44, 95, 120, 174, 175
    See application file for complete search history.

(56) References Cited

U.S. PATENT DOCUMENTS

2009/0039810 A1     2/2009    Gotz et al.
2016/0329849 A1    11/2016    Nakajima et al.

* cited by examiner

METHOD FOR ESTIMATING THE ANGULAR POSITION OF A ROTOR OF AN ELECTRIC DRIVE SYSTEM

CROSS REFERENCE TO RELATED APPLICATION

This application claims foreign priority benefits under U.S.C. § 119 to French Patent Application No. 1751047 filed on Feb. 8, 2017, the content of which is hereby incorporated by reference in its entirety.

FIELD OF ART

Generally, the invention relates to the control of a rotary electric machine, in particular with a permanent magnet, of an electric drive system, such as for example an electric motorisation system of an electric or hybrid vehicle.

In particular, the present invention relates to a method for estimating the angular position and the speed of the rotor of such electric drive systems.

Indeed in a rotary electric machine, in particular with a permanent magnet, the information on the angular position of the rotor is indispensable for controlling the production of the required drive torque.

Generally, a rotary electric machine comprises a stator that corresponds to the fixed portion of the machine, and a rotor, which corresponds to the rotating portion of the machine. In particular in the context of an electric or hybrid motorisation system for a vehicle, the rotor is integral with the drive shaft. In order to control the production of the drive torque of the rotor, and therefore the rotation speed of the drive shaft driven in rotation by the rotary electric machine, it is essential to know at all times, with precision, the angular position of the drive shaft.

In prior art, a physical position sensor is arranged in the electric machine. Such a sensor comprises a fixed portion and a portion arranged on the rotating portion (rotor or drive shaft), that makes it possible to directly measure the angular position of the rotor. From this measurement is derived the rotation speed of the shaft, with the torque able to be produced by the electric machine driving said drive shaft being determined from these values. When the data coming from such a sensor is lost, for example because said sensor is out of service, it is indispensable to obtain the angular position of the rotor via another means.

STATE OF ART

An immediate solution consists in providing a redundancy by integrating at least one second physical sensor. However, the redundancy of the physical sensor has a high cost, in particular in compatible with the cost requirements in the world of automobiles.

Alternatively, as is known, when the angular position sensor of the rotor is lost, the angular position of the rotor can be estimated by digital methods. It can even be considered to replace the physical sensor or sensors with one or several sufficiently accurate digital estimators.

Today, it is substantially the use of such estimators in downgraded mode, also designated as "limp-home", which is considered in particular in the case of the electric vehicle. The principle of such a limp-home application resides in the setting up of a downgraded usage mode of the motorisation system which allows, in the automobile context, the vehicle to continue to operate, in downgraded conditions in terms of performance, so as be able to "return home" safely, despite the loss of the sensor providing the direct information of the angular position of the drive shaft.

As such, document Ehsan Dehgan-Azad and al., "Sensorless Control of IM for limp-home Mode EV Applications", in IEEE Transactions on Power Electronics describes a limp-home application, relating to an asynchronous electric motor, with the method described based on the modelling of the behaviour of the electric machine of the motorisation system. From this model is derived the estimate of the angular position of the drive shaft. The frozen model described in this document does not however function correctly at low speed. In addition, it cannot be transposed without adapting the model and its performance has been proven only for the case of an asynchronous electric machine in the framework of this publication.

In document US 20110028975 in particular, another technique for estimating the angular position of a rotor in a rotary electric machine is described. The method for estimating described in this document implements a well-known technique based on the injection of high frequency signals superposed to the fundamental of excitation tension of the electric machine. In this case, the high frequency voltage injected is added to the voltage coming from the controller charged with controlling the electric currents that supply the electric machine. At the output of the electric machine, the current comprises a high frequency component which, after processing, makes it possible to estimate the angular position of the rotor.

However, this known technique based on the injection of high frequency signals does not provide satisfactory results, in particular at high speed, as the voltage injected generates increasing losses, or detrimental electrical consumption, in particular in an electric vehicle. In addition, this technique generates torque oscillations that can alter the operation of the electric drive.

There is therefore a need for a method for estimating the angular position of a drive shaft of an electric or hybrid motorisation system that operates reliably, in a stable and precise manner, at a reduced rotation speed of the rotor or even zero speed as well as at a moderate or high rotation speed.

For this purpose, the present invention proposes in particular the combination of a technique of estimating by injection of high frequency signals, at a low rotation speed of the shaft, and a technique of estimating using a learned model, in particular based on a neural network, at a moderate to high rotation speed of the rotor.

SUMMARY

More precisely, the present invention has for object a method for estimating the angular position of a rotor in relation to a stator in a rotary electric machine, such as an electric machine of an electric or hybrid motorisation system, comprising:
  estimation the angular position and/or of the rotation speed of the rotor via a method of injecting high frequency signals as long as the absolute value of the rotation speed of the rotor, derived from said angular position, is less than a first predefined threshold;
  estimating the angular position and/or of the rotation speed of the rotor by a model coming from a learning method as long as the absolute value of the rotation speed of the rotor, derived from said angular position, is greater than a second predefined threshold.

Thanks to the present invention, in particular in the case of a fault with a physical sensor that is supposed to provide the module for controlling the torque generated by a rotary electric machine, for example integrated into an electric or hybrid motorisation system, in particular of a vehicle, a reliable estimate of the angular position and/or of the speed of the rotor is available, accurate and stable, regardless of the rotation speed of the rotor.

In particular, the model is formed by a learning which establishes a correspondence between the phase currents and voltages on one side and the position of the rotor on the other. The estimation of the angular position by the model issued from the learning method is accurate at moderate and high speed. However, at a low speed and especially around a zero speed, the estimate operating by means of a learned model is imprecise. The estimating through a method of injection makes it possible to overcome the imprecision at low speed.

Advantageously, the model comprises a neural network of which the weights and/or internal connections come from the learning method.

According to an embodiment, the method of injecting high frequency signals is a pulsating method.

According to an embodiment, the method of injecting high frequency signals is a rotary method.

Furthermore, the invention relates to a method for controlling an electric machine, in particular the torque that it produces, its speed or its currents.

According to an embodiment, such a method relates to a method for controlling the torque produced by a rotary electric machine, in particular with permanent magnets, said electric machine comprising a rotor and a stator, a physical sensor that measures the angular position and/or the rotation speed of the rotor, said method comprising the controlling of the torque to be produced by the electric machine according to the angular position and/or of the rotation speed of the rotor measured by the physical sensor as long as said physical sensor is available and, if said physical sensor is in fault, the control of the torque to be produced by the electric machine according to the estimated angular position and/or rotation speed of the rotor, according to the method such as briefly described hereinabove.

In practice, a specific method can then provide the information relating to the fact that there is a fault with the physical sensor.

Advantageously, according to an embodiment, the torque generated by the electric machine has a maximum value that corresponds to a maximum current that can be reached or to a maximum voltage available, and, in the event of a fault with the physical sensor, the maximum value of the torque generated by the electric machine is reduced in such a way as to correspond to a downgraded maximum torque.

Moreover, the present invention relates to a device for controlling an inverter supplying the phases of a stator of a rotary electric machine moreover comprising a rotor, said control device comprising a module for estimating the estimated angular position and/or said rotation speed derived from said angular position of the rotor configured to implement the method presented briefly hereinabove, said estimated angular position and/or said rotation speed derived from said angular position of the rotor being taken into account for controlling said inverter.

According to an embodiment, such a device for controlling an inverter comprises a first estimator in order to estimate the angular position and/or of the rotation speed of the rotor via a method of injecting high frequency signals, a second estimator for estimating the angular position and/or the rotation speed of the rotor by a model coming from a learning method and a decision module in order to carry out the selection, according to the speed derived from the angular position of the rotor coming from the first estimator or from the second estimator, of the first or of the second estimator as a source of the estimated angular position and/or rotation speed taken into account for controlling said inverter.

The present invention also relates to an electric or hybrid motorisation system for a vehicle, comprising a drive shaft driven by a rotor of a rotary electric machine moreover comprising a stator supplied by an inverter, as well as a device for controlling the inverter such as briefly presented hereinabove.

The present invention also relates to a motor vehicle comprising an electric or hybrid motorisation system such as briefly described hereinabove.

BRIEF DESCRIPTION OF THE DRAWINGS

The invention shall be better understood when reading the following description, provided solely by way of example, and in reference to the annexed drawings which show.

DETAILED DESCRIPTION OF THE INVENTION

Recall that the present invention is described hereinafter using various non-limiting embodiments and is able to be implemented in alternatives that are within the scope of those skilled in the art, also the aim of the present invention.

In particular, although the present invention preferably relates to an application to an operating mode of the "limp-home" type in a motor vehicle, any implementation of the invention for estimating the angular position of a rotor of a rotary electric machine, in any electric drive system, is also the aim. More generally, the present invention as such proposes a method for estimating the angular position of a rotor in relation to a stator, in particular in an electric motor with permanent magnets. In addition the electric machine of an electric or hybrid motorisation system for a vehicle, it can for example be the determining of the angular position and the speed of the rotor of an electric machine of a cooling system for example.

Figure 1:
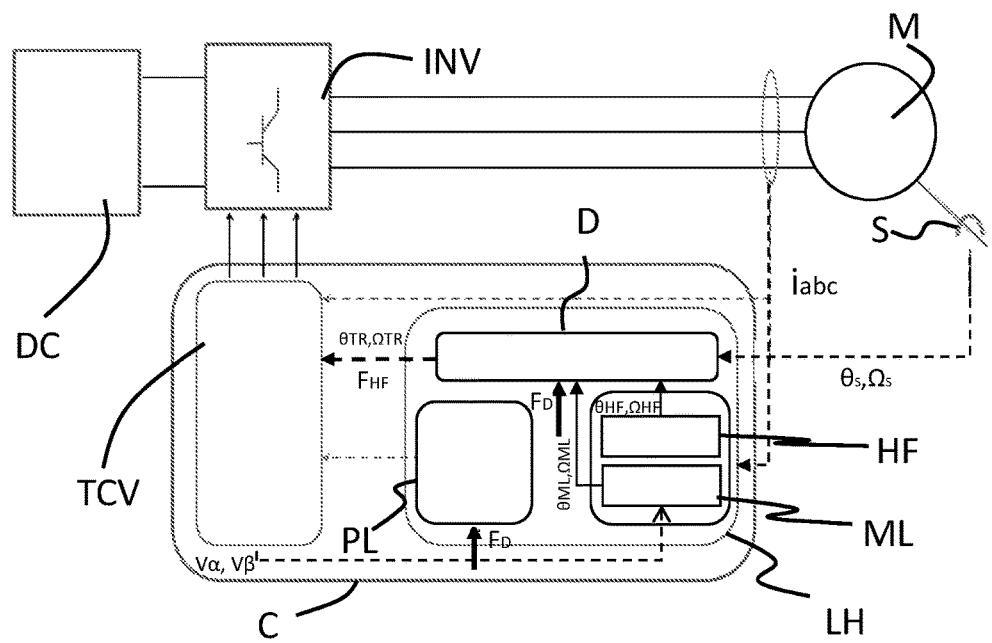
FIG. 1, the block diagram of an electric motorisation system implementing the method according to the invention.

FIG. 1 shows the diagram of an electric drive system using the invention, in particular for the purpose of implementing a limp-home application in a vehicle.

The electric drive system diagrammed in FIG. 1 comprises:
 a DC battery that provides the supply in direct current;
 an inverter INV;
 an electric machine M;
 a control module C, that here has a limp-home operating mode.

The power stage, comprising the DC battery and the inverter INV, supplying the electric machine M, is here three-phase, but it could also have a different number of phases.

The control module C comprises a module for controlling TCV the torque required for the power stage. The input data provided to said module for controlling the torque TCV are the angular position $\theta$ of the rotor and the rotation speed $\Omega$ of the rotor which is derived therefrom, as well as the phase currents of the electric machine M. This angular position and speed data comes, according to the case, from the physical sensor S, from the first HF estimator based on the injection of high frequency signals or from the second ML estimator based on a learning method.

According to an embodiment, for the purpose of a use in limp-home mode for the controlling of a downgraded operating mode of an electric or hybrid motorisation system for a vehicle, the control module C furthermore has a limp-home module LH able to acquire information FD of the fault of the physical sensor S or to detect such a fault, by means that can control, where applicable, a limiting of the power of the electric drive system by suitable means PL, and to carry out the choice, by means of the decision module D, between the information coming from the first HF estimator based on the injection of high frequency signals and that coming from the second ML estimator based on a learning method, with the purpose of providing the best estimates $\theta_{tr}$, $\Omega_{tr}$ of the angular position and of the speed of the rotor to the module for controlling the torque TCV in case of a fault with the physical sensor S.

In practice, in case of a fault with the physical sensor, a specific method determines if the physical sensor is in fault and communicates where applicable the information FD relating to the fact that said physical sensor is in fault to the decision module D. The module D selects the estimated position and the speed $\theta_{tr}$, $\Omega_{tr}$ configured to be used in the module TCV. According to the preferred embodiment, the first HF estimator and the second ML estimator operate permanently, in that they estimate the angular position and the speed of the rotor at any time, whether the physical sensor S is operating correctly or is in fault, and regardless of the rotation speed of the rotor.

In practice, if no fault of the physical sensor S is detected, the angular position and speed information of the shaft $\theta$S, $\Omega$S are provided to the module for controlling the torque TCV by said physical sensor S.

Figure 2:
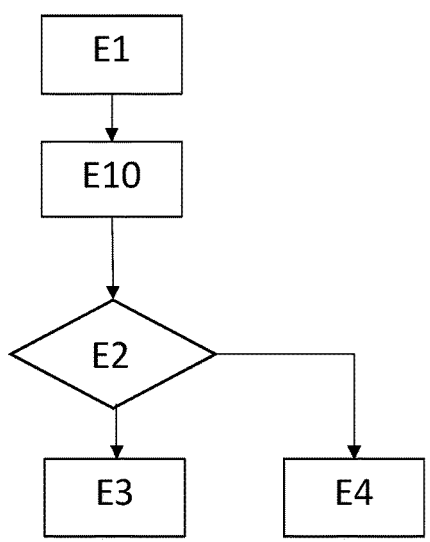
FIG. 2, the block diagram showing the steps of the method according to invention.

In reference to FIG. 2, in case of the detection of a fault with the physical sensor S (step E1), the information $\theta$tr, $\Omega$tr of the estimated angular position and speed of the rotor are transmitted to the module for controlling the torque TCV. The angular positions and rotation speeds of the rotor estimated by the first HF estimator, $\theta$HF, $\Omega$HF, and by the second ML estimator, $\theta$ML, $\Omega$ML, are distinguished according to the estimated rotation speed of the rotor (step E2).

The information $\theta$tr, $\Omega$tr transmitted to the module for controlling the torque TCV is therefore either the angular position and the rotation speed of the rotor $\theta$HF, $\Omega$HF estimated by the first HF estimator, or that $\theta$ML, $\Omega$ML estimated by the second ML estimator, according to the estimator selected by the decision module D.

As such, if the estimated speed of the shaft at the time of the previous sampling is less than a predetermined threshold, the first HF estimator is selected and the estimates $\theta$HF, $\Omega$HF, which come from it are provided to the module for controlling the torque TCV (step E3); on the contrary, if the estimated speed of the rotor at the time of the previous sampling is greater than the predetermined threshold, the estimates $\theta$ML, $\Omega$ML coming from the second ML estimator are provided to the module for controlling the torque TCV (step E4).

The step E4 comprises moreover, according to an embodiment, a substep of sending a $F_{HF}$ signal to the module for controlling the torque TCV configured so that this latter activation or deactivation controls the injection of high frequency voltage. Said signal consists for example in a Boolean that allows for the activation by the module for controlling the torque TCV of the injection of high frequency voltage if the estimated speed of the rotor implies that the estimates coming from the first HF estimator are those that will be processed by said module for controlling the torque TCV and, reciprocally, the deactivation by the module for controlling the torque TCV of the injection of high frequency voltage when the estimated speed of the rotor implies that the estimates coming from the second ML estimator are those that will be processed by said module for controlling the torque TCV.

In parallel, according to the embodiment relating to the implementation of an operation of the limp-home type of an electric or hybrid vehicle, the module for controlling the torque TCV is informed of a limitation of the maximum power authorised, in such a way as to determine a torque required of the power chain that is compatible with this power limitation (step E10).

Note that the first HF estimator as the second ML estimator carry out their estimates $\theta$HF, $\Omega$HF, $\theta$ML, $\Omega$ML relating to the angular position and to the speed of the rotor using measurements of current $i_{abc}$ and voltage references $v_{abc}$ of each phase of the electric machine.

The determination of the speed threshold depends on the characteristics of the electric machine and effective performance of the first and second estimators HF, ML.

Figure 3:
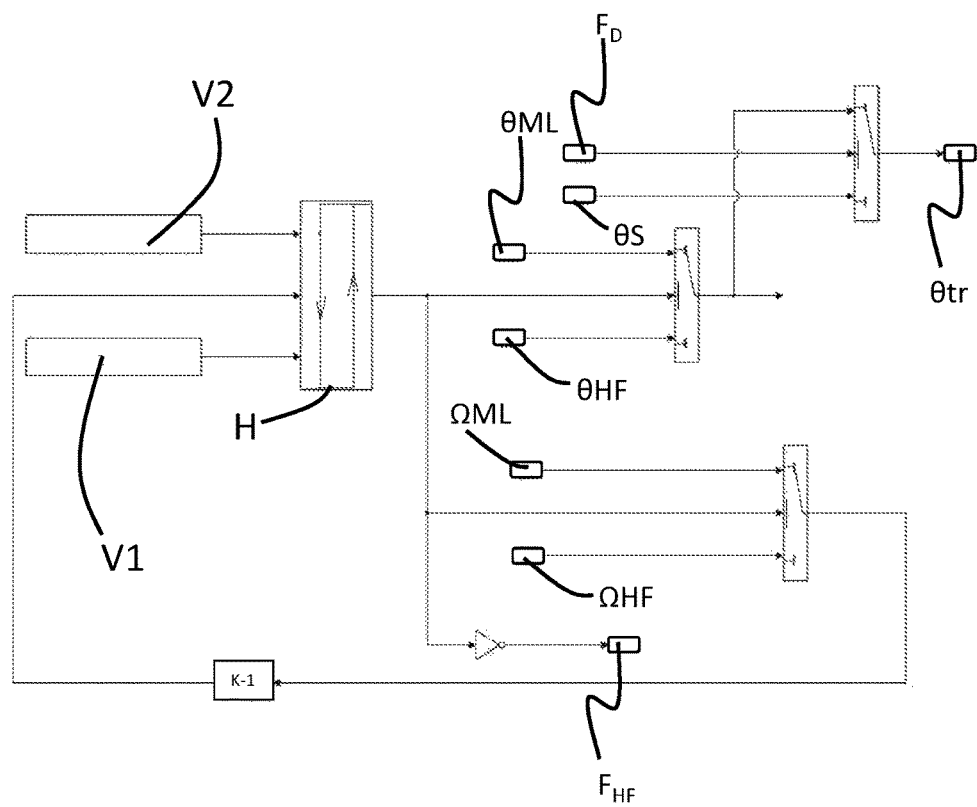
FIG. 3, the logical diagram showing the operation of the decision module.

In reference to FIG. 3, according to a preferred embodiment, an hysteresis H is provided around the predetermined speed thresholds in order to prevent any oscillation between an estimator and another in the case where the speed of the rotor is close to the chosen predetermined threshold value. As such, the first HF estimator is selected by the decision module D as long as the estimated rotation speed of the rotor is less than a first predetermined threshold V1 beyond which the second ML estimator is selected. The switching from the second ML estimator to the first HF estimator is carried out by the decision module D when the estimated rotation speed of the rotor becomes less than a second predetermined threshold V2, less than the first threshold.

In practice, said predetermined threshold and in particular the hysteresis are more preferably chosen at a value where the first and second estimators HF, ML are stable. Furthermore, there is an interest, when the second ML estimator provides precise and stable results, in stopping the injection of high frequency signals, in order to prevent any overconsumption of electricity and any oscillation of the torque. To the nearest aforementioned hysteresis, the threshold can therefore be determined as being the minimum speed of the rotor starting from which the second ML estimator is able to estimate the angular position of the rotor in a stable and precise manner.

For example, in the context of an electric or hybrid motorisation system for a motor vehicle, the predetermined threshold of the rotation speed of the rotor is set to 1,500 rpm for a maximum speed of the machine around 15,000 rpm (or about 10% of the maximum speed). In this case, in the hypothesis of a fault with the physical sensor S, the first HF estimator is chosen to provide the angular position and speed of the rotor $\theta_{tr}$, $\Omega_{tr}$ to the module for controlling the torque TCV as long as the rotation speed of the rotor is less than 1,500 rpm. Beyond 1,500 rpm, it is the second ML estimator that provide the estimates $\theta_{tr}$, $\Omega_{tr}$ of the angular position and of the speed of the rotor to the module for controlling the torque TCV in case of a fault with the physical sensor S. Preferably, the permutation between the first HF estimator and the second ML estimator, and reciprocally, is produced according to a hysteresis based on the value of the predetermined threshold of 1,500 rpm. In this case, for example, the first HF estimator is selected by the decision module D as long as the estimated rotation speed of the rotor is less than 1,500 rpm; beyond this speed, the second ML estimator is selected by the decision module D. Then, the switching over the first estimator is carried out when the estimated rotation speed of the rotor becomes less than 500 rpm.

As already mentioned, a main application of the present invention resides in the implementation of a downgraded mode of controlling the torque generated by the electric machine in case of a fault with the physical sensor S.

In this case, the angular position and speed data of the rotor measured directly θS, ΩS by the physical sensor S are used by the module for controlling the torque TCV as long as said physical sensor S is available. As soon as a fault with the physical sensor S is detected, the module for controlling the torque TCV receives the estimates relating to the angular position and the speed of the rotor coming from either the first HF estimator, or from the second ML estimator, in accordance with the method described hereinabove.

In this downgraded mode, preferably, the power of the machine is limited, which consequently limits the maximum torque authorised that can be generated by the electric machine M, with the purpose being to allow for a "return home" of the vehicle in good conditions of safety, i.e. in particular by preventing any exceptional measure of the "emergency stop" type, given that the estimates of the angular position and the speed of the rotor, this data being required for the precise control of the torque required of the electric machine M, are considered as a priori less reliable than those coming from the physical sensor S.

However, other applications of the invention, independent of the limp-home mode, are also considered. In particular, the values estimated by the first HF estimator and/or the second ML estimator, according to the case, can be compared to the data coming from the physical sensor S for a coherency control, even for detecting a possible fault with said physical sensor S in the framework of a safety application.

For example, the angular position obtained by the present method can make it possible to calculate an estimate of the torque. By comparing the estimated torque with the reference of the torque, the presence of a fault can then be verified.

Furthermore, a use of the double estimation of the angular position and the speed of the rotor is considered for an application "without sensor" allowing for the control of an electric machine, in particular of the torque generated by such an electric machine of an electric or hybrid motorisation system.

In the rest of the description, several coordinate systems are associated respectively with the stator and with the rotor of the rotary electric machine M.

Firstly, a fixed coordinate system is linked to the stator. This three-phase coordinate system is often noted, in the state of the art, (u,v,w) or (a,b,c).

The coordinate system (α,β) is obtained via a "Clarke" (amplitude conservation) or "Concordia" (power conservation) transformation of the three-phase coordinate system presented hereinabove, linked to the stator of the electric machine.

The coordinate system (d,q) corresponds to a common coordinate system that makes it possible to represent the stator windings as well as the rotor winding of the electric machine on a single referential with two axes (d,q). It is obtained by applying a rotation of an angle θ, θ being the current angular position of the rotor, to the two-phase coordinate system (α,β), or by applying the "Park's" transformation to the three-phase stator coordinate system (u,v,w).

Example of the Method of Estimating by the First HF Estimator

The first HF estimator is based on the injection of high frequency signals that are superposed with the voltages for controlling the torque of the electric machine M. Preferably, the first HF estimator implements a pulsating method, considered to be simpler and therefore lighter in terms of the implementation thereof on an on-board microcontroller, because the latter is limited in terms of calculating power. However, the implementing of a rotary method can be provided.

According to the pulsating method, the voltage Vh of frequency fh is injected on the estimated axis d of the rotor and superposed on the reference voltage coming from the control module for the purpose of controlling the inverter INV supplying in turn the electric machine M.

In the estimated coordinate system (d,q), the expression of the high frequency component of the current is such that:

$$\tilde{I}_{dq}^{r} = [I_{hp} - I_{hn}e^{(-2j\theta_{err})}]\sin(\omega_h t)$$

where $$\frac{I_{hp}}{2} = \frac{(L_d + L_q) \cdot V_h}{2w_h L_d L_q} \text{ and } \frac{I_{hn}}{2} = \frac{(L_d - L_q) \cdot V_h}{2w_h L_d L_q},$$

$L_d$ and $L_q$ are the inductances of the electric machine expressed in the coordinate system (d, q). Their values are sensitive to the level of current. Ld and Lq are here considered as average values over the entire range of the variation in the current, $w_h = 2\pi f_h$, $\theta_{err}$ is the error between the estimated value of the angular position of the rotor and its actual position, From these results, after processing, the error $\theta_{err}$ on the angular position estimated by the first HF estimator. From this error, thanks to a proportional integral observer, the speed of the rotor is calculated, as well as the angular position of the rotor by integration of said speed.

Example of the Method of Estimating by the Second ML Estimator

The second estimator determines the angular position and the speed of the rotor by a model coming from learning. According to the preferred embodiment, the model comprises a neural network of which the weights and/or connections come from said learning.

Such a second ML estimator, based on a neural network, is typically constructed using the Matlab Neuronal Network Toolbox software, using statistical data and techniques coming in particular from M. B. Howard Demuth et al., Neural Network Toolbox: For Use with MATLAB, MathWorks, 2009.

The behaviour of the neural network is defined by the connection of individual elements and the weight given to each one. The weights of the individual elements are adjusted according to a specific training, called learning.

It is consequently necessary to meticulously acquire precise data dedicated to the learning, i.e. the currents $I_\alpha$, $I_\beta$, and the voltages $V_\alpha$, $V_\beta$ described hereinafter, and the corresponding angular position. The learning process of the second ML estimator then makes it possible to generate a function for estimating the angular position of the rotor, in the application considered. Said function for estimating is written:

$$\hat{\theta} = f(I_\alpha, I_\beta, V_\alpha, V_\beta) \qquad 5$$

where $I_\alpha, I_\beta, V_\alpha, V_\beta$ are respectively the currents and the voltages in the fixed coordinate system $(\alpha, \beta)$. Said currents expressed in the coordinate system $(\alpha, \beta)$ are obtained, after a "Concordia" transformation, from measurements of three-phase currents. The voltages expressed in the coordinate system $(\alpha, \beta)$ are digital measurements coming from the control module TCV; more precisely, this entails, according to an embodiment, components of the reference voltage coming from the control module TCV, expressed in the coordinate system $(\alpha, \beta)$.

A homogeneous meshing is carried out, in a bracket of motor speeds that cover the entire implementation range of the second ML estimator, which makes it possible to establish a correspondence between said currents and said voltages $I_\alpha$, $I_\beta$, $V_\alpha$, $V_\beta$ and the angular position of the rotor, thanks to a panel of verified data.

Then, the learning function makes it possible to obtain a neural network configured to autonomously estimate the angular position and the speed of the rotor using currents and voltages $I_\alpha$, $I\beta$, $V_\alpha$, $V_\beta$, in particular using currents $I_\alpha, I\beta$ obtained from current and voltage measurements $V_\alpha$, $V_\beta$ corresponding to reference voltages.

The invention claimed is:

1. A method for estimating the angular position of a rotor in relation to a stator of a rotary electric machine, such as an electric machine of an electric or hybrid motorisation system, comprising:
   estimating the angular position and/or of the rotation speed of the rotor via a method of injecting high frequency signals as long as the absolute value of the rotation speed of the rotor, derived from said angular position, is less than a first predefined threshold (V1);
   estimating the angular position and/or of the rotation speed of the rotor via a model coming from a learning method as long as the absolute value of the rotation speed of the rotor, derived from said angular position, is greater than a second predefined threshold.

2. The method according to claim 1, wherein the model comprises a neural network of which the weights and/or internal connections come from the learning method.

3. The method according to claim 2, wherein the method of injecting high frequency signals is a pulsating method.

4. The method according to claim 2, wherein the method of injecting high frequency signals is a rotary method.

5. The method according to claim 1, wherein the method of injecting high frequency signals is a pulsating method.

6. The method according to claim 1, wherein the method of injecting high frequency signals is a rotary method.

7. A method for controlling the torque produced by a rotary electric machine, in particular with permanent magnets, said electric machine comprising a rotor and a stator, a physical sensor that measures the angular position and/or the rotation speed of the rotor, with said method comprising the controlling of the torque to be produced by the electric machine according to the angular position and/or of the rotation speed of the rotor measured by the physical sensor as long as said physical sensor is available and, if said physical sensor is in fault, the controlling of the torque to be produced by the electric machine according to an estimated angular position and/or of a rotation speed of the rotor, according to the method comprising:
   estimating the angular position and/or of the rotation speed of the rotor via a method of injecting high frequency signals as long as the absolute value of the rotation speed of the rotor, derived from said angular position, is less than a first predefined threshold;
   estimating the angular position and/or of the rotation speed of the rotor via a model coming from a learning method as long as the absolute value of the rotation speed of the rotor, derived from said angular position, is greater than a second predefined threshold.

8. The method as claimed in claim 7, further comprising the torque generated by the electric machine having the maximum value corresponding to a maximum current that can be reached or to a maximum voltage available, wherein, in the event of a fault with the physical sensor, the maximum value of the torque generated by the electric machine is reduced in such a way as to correspond to a downgraded maximum torque.

9. The method according to claim 7, wherein the model comprises a neural network of which the weights and/or internal connections come from the learning method.

10. The method according to claim 7, wherein the method of injecting high frequency signals is a pulsating method.

11. The method according to claim 7, wherein the method of injecting high frequency signals is a rotary method.

12. A device for controlling an inverter supplying the phases of a stator of a rotary electric machine comprising moreover a rotor, said control device comprising a module for estimating the angular position and/or the rotation speed of the rotor configured to implement the method comprising:
   estimating the angular position and/or of the rotation speed of the rotor via a method of injecting high frequency signals as long as the absolute value of the rotation speed of the rotor, derived from said angular position, is less than a first predefined threshold,
   estimating the angular position and/or of the rotation speed of the rotor via a model coming from a learning method as long as the absolute value of the rotation speed of the rotor, derived from said angular position, is greater than a second predefined threshold,
   wherein said estimated angular position and/or said rotation speed derived from said angular position of the rotor is taken into account for the controlling of said inverter.

13. The device as claimed in claim 12, comprising a first estimator in order to estimate the angular position and/or the rotation speed of the rotor via a method of injecting high frequency signals, a second estimator for estimating the angular position and/or the rotation speed of the rotor by the model coming from a learning method and a decision module in order to carry out the selection, according to the speed of the rotor derived from the angular position coming from the first estimator or from the second estimator, of the first or of the second estimator as a source of the estimated angular position and/or rotation speed of the rotor taken into account for the controlling of said inverter.

14. An electric or hybrid motorisation system for vehicle, comprising a drive shaft driven by a rotor of a rotary electric machine moreover comprising a stator supplied by an inverter, as well as a device for controlling the inverter according to claim 13.

15. A motor vehicle comprising an electric or hybrid motorisation system as claimed in claim 14.

16. An electric or hybrid motorisation system for vehicle, comprising a drive shaft driven by a rotor of a rotary electric machine moreover comprising a stator supplied by an inverter, as well as a device for controlling the inverter according to claim 12.

17. A motor vehicle comprising an electric or hybrid motorisation system as claimed in claim 16.

18. The device according to claim 12, wherein the model comprises a neural network of which the weights and/or internal connections come from the learning method.

19. The device according to claim 12, wherein the method of injecting high frequency signals is a pulsating method.

20. The device according to claim 12, wherein the method of injecting high frequency signals is a rotary method.

* * * * *